United States Patent
Dodd

(10) Patent No.: US 6,832,660 B2
(45) Date of Patent: Dec. 21, 2004

(54) RETROFIT KIT FOR MOTORIZING A COLLAPSIBLE MINI SCOOTER

(76) Inventor: Leonard Allan Dodd, 28005 Via Moreno, Laguna Niguel, CA (US) 92677

( * ) Notice: Subject to any disclaimer, the term of this patent is extended or adjusted under 35 U.S.C. 154(b) by 191 days.

(21) Appl. No.: 09/976,827

(22) Filed: Oct. 12, 2001

(65) Prior Publication Data

US 2002/0063007 A1 May 30, 2002

Related U.S. Application Data

(60) Provisional application No. 60/240,548, filed on Oct. 12, 2000.

(51) Int. Cl.[7] .............................................. B62M 7/00
(52) U.S. Cl. ..................................................... 180/220
(58) Field of Search ................................ 180/220, 181

(56) References Cited

U.S. PATENT DOCUMENTS

| 4,958,842 | A | * | 9/1990 | Chang ........................ 280/7.1 |
|---|---|---|---|---|
| 5,388,659 | A | * | 2/1995 | Pepe .......................... 180/219 |
| 5,775,452 | A | * | 7/1998 | Patmont ...................... 180/181 |
| 5,848,660 | A | * | 12/1998 | McGreen ..................... 180/206 |
| 6,095,274 | A | * | 8/2000 | Patmont ...................... 180/181 |
| 6,179,307 | B1 | * | 1/2001 | Mao ........................ 280/87.041 |
| 6,279,929 | B1 | * | 8/2001 | Fruechtenicht ......... 280/87.041 |
| 6,345,678 | B1 | * | 2/2002 | Chang ......................... 180/181 |
| 6,347,681 | B1 | * | 2/2002 | Patmont et al. ............. 180/220 |
| 6,431,301 | B1 | * | 8/2002 | Forbes ........................ 180/185 |
| 6,431,302 | B2 | * | 8/2002 | Patmont et al. ............. 180/228 |
| 6,609,584 | B2 | * | 8/2003 | Patmont et al. ............. 180/220 |
| 6,619,679 | B2 | * | 9/2003 | Lan .......................... 280/87.05 |

* cited by examiner

*Primary Examiner*—Lesley D. Morris
*Assistant Examiner*—Paul Royal, Jr.
(74) *Attorney, Agent, or Firm*—MacMillan, Sobanski & Todd, LLC

(57) ABSTRACT

A motorized retrofit kit for lightweight collapsible mini scooter is a complete conversion for a lightweight push scooter to a motor driven unit. Owners of existing scooters can install a mini electric motor battery system, wiring and on/off button with limited skills and equipment to drive the rear wheel of the scooter.

17 Claims, 4 Drawing Sheets

RETROFIT KIT FOR MOTORIZING A COLLAPSIBLE MINI SCOOTER

CROSS-REFERENCE TO RELATED APPLICATION

The present invention claims the priority date of a prior filed provisional patent application having Ser. No. 60/240,548, and official filing date of Oct. 12, 2000, and which discloses substantial similar matter as described herein.

BACKGROUND OF THE INVENTION

1. Field of Invention

The present invention is directed to a collapsible motorized mini scooter, a retrofit motorized unit in kit form for a mini scooter.

2. Description of the Related Art

During the past few years, the lightweight collapsible mini scooter has become very popular in the market place. The scooter is very durable and very compact when folded up. The steering tube can be collapsed, the handle grips folded and the unit can be placed in a bag and carried over one's shoulder. Children, teenagers and some adults use the mini scooter today. A motorized, unit for these existing scooters would be a great added value and enjoyment for existing scooter owners, as long as it comes in a kit form and is easy to install with minimum skills and equipment.

SUMMARY OF INVENTION

The invention is embodied in a kit form converting a non-motorized mini scooter into a motorized scooter which does not damage the original scooter construction by drilling, machining or breaking any of the original parts of the scooter. The kit will provide all the components to convert and motorize the mini scooter: motor, batteries, charging system and hardware for installation.

Power to the motor will begin when the rider engages a switch, which sends current to a relay, which in turn sends current to the motor, the motor thereby driving a rear wheel causing forward motion of the scooter. When the rider releases the switch, the current is discontinued. The drive is engaged by a positive lock lever or thumbscrew mounted with the motor bracket. A NiCad battery pack and the required relay are in a cavity located underneath a footrest platform. The motor bracket is placed where an existing fender is located by replacing the fender with the bracket and the motor. In turn, the fender is then placed on the motor bracket. The motor is activated by a button switch mounted on the scooter handle bar and ground current to the relay is sent through a rotating contact shoe on an adjustable handle bar tube, or an optional remote system a transmitter on the handle grips and an additional receiver located in the battery cavity. A cam lock motor bracket adjuster is used as well as a foot lock motor adjuster. The forward motion is obtained by a small spindle located on the electric motor shaft, which comes in contact with the rear wheel.

DETAILED DESCRIPTION OF THE INVENTION

Figure 1:
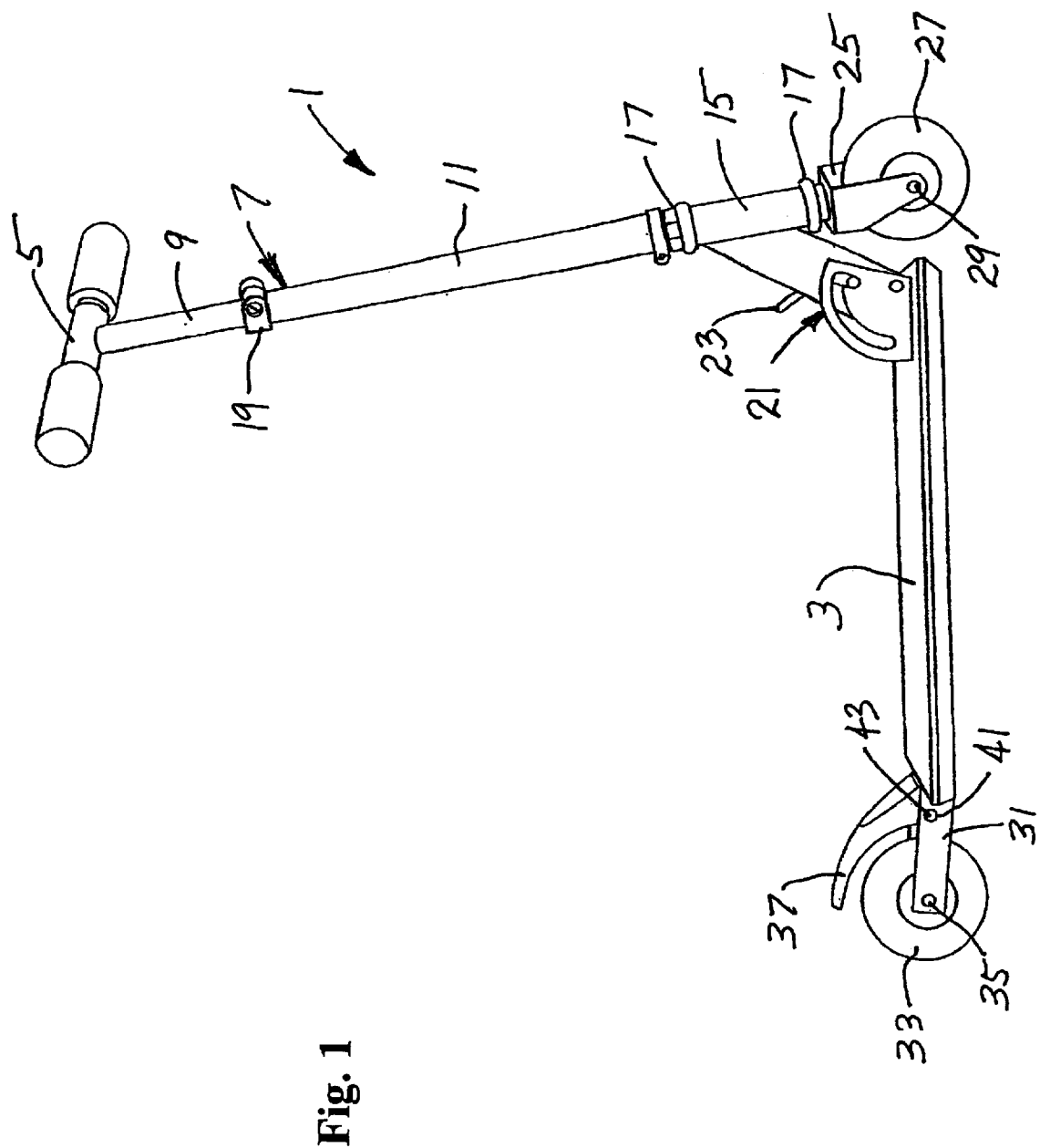
FIG. 1 is a side view of a razor type mini scooter.

While the present invention is susceptible of embodiment in various forms, there is shown in the drawings and will hereinafter be described the presently preferred embodiments of the invention with the understanding that the present disclosure is to be considered as an exemplification of the invention and it is not intended to limit the invention to the specific embodiments illustrated.

The invention is embodied in a kit for converting a non-motorized scooter into a motorized scooter which does not damage the original scooter's construction by drilling, machining or breaking any of the scooter's original parts. Referring to FIG. 1, a non-motorized scooter 1 for use with the kit 51 (FIG. 3) of the present invention includes a base platform 3 which is stepped upon by the rider when the scooter 1 is in use. The scooter 1 also includes a head tube 15, which attaches to the front of the base platform 3 by a hinge assembly 21. The hinge assembly 21 permits the head tube 15 to rotate approximately 90 degrees from a reclined position for storage, to an extended position for use. The hinge assembly 21 preferably includes a hinge lock 23 for locking the head tube 15 in either a reclined or extended position. Telescoping through the head tube 15 is a steering column 7 including an upper tube 9 and a lower tube 11. The steering column 7 is rotatably attached to the head tube 15 using bearings 17, which are mounted to the top and bottom interior of the head tube 15. Preferably, the upper tube 9 is slidably telescopic within lower tube 11 and can be locked in various vertical positions using a clamp lock 19. At the top of the steering column 7 are horizontally extending handlebars 5 which enable the rider to rotate the steering column 7 by manual rotation of the handlebars 5. Affixed at the bottom of the steering column 7 is a front fork 25. Rotatably mounted by a front axle 29 to the front fork 25 is a front wheel 27.

At the rear of the scooter 1 is a rear fork 31, which extends rearwardly from the rear of the base platform 3. The rear fork 31 is applied to a laterally extending rear axle 35, which rotatably mounts the scooter's rear wheel 33. Preferably, the scooter 1 also includes a rear fender foot brake 37. The fender foot brake 37 is hingedly attached to the front of the rear fork 31 by a pin, or a screw and nut combination, which extends laterally through two holes 41 formed in the rear fork 31 and two corresponding holes formed at the front of the fender foot brake 37. The fender foot break 37 is biased upwardly by a spring (not shown). In use, a rider of the scooter 1 depresses the fender foot brake 37 against the rear wheel 33 to inhibit the wheel's rotation and cause braking of the scooter 1.

Figure 4:
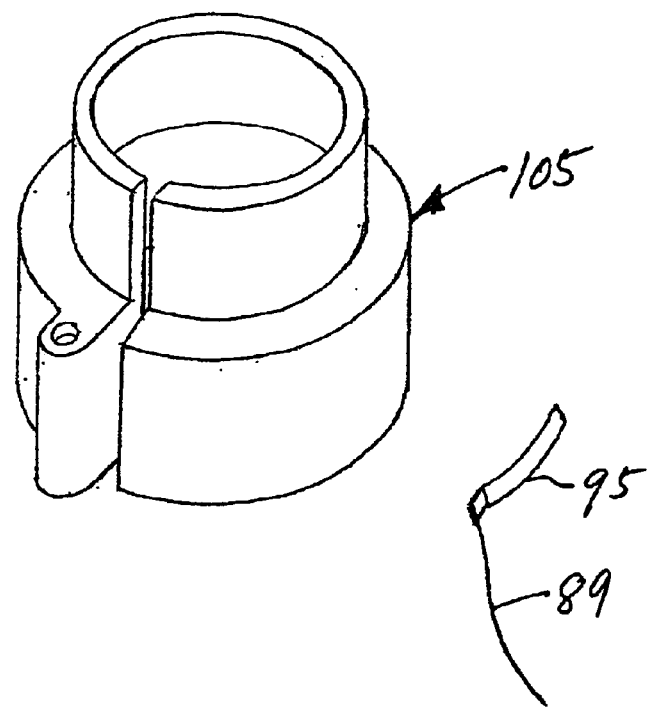
FIG. 4 is a perspective view of the collar shown in FIG. 3.
Figure 5:
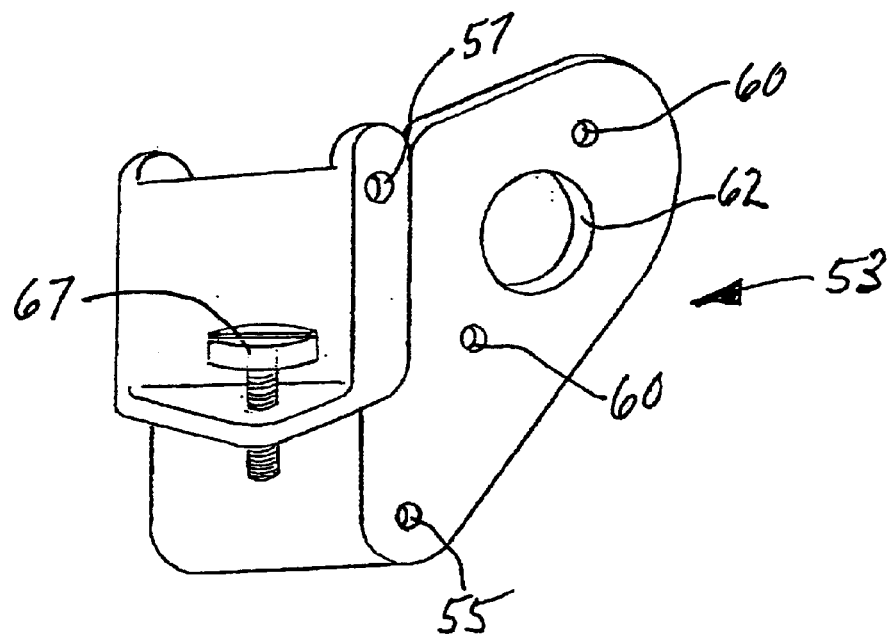
FIG. 5 is a perspective view of the motor bracket with thumbscrew shown in FIG. 3.

The scooter 1 of the prior art provides a lightweight collapsible structure, which is driven by a user by a push-and-go method in which a rider uses one of his feet to propel the scooter which is ridden by balancing on the rider's other foot. Referring to all of the FIGS. 2–5, and particularly FIG. 3, the kit 51 of the present invention is directed to converting the non-motorized scooter of the prior art into a motorized structure 50. The kit 51 includes a bracket 53 (best shown in FIG. 5, a motor 59 and an additional fender foot brake 63 already affixed to the bracket 53. Referring to FIG. 5, to this end, the bracket 53 includes a pair of top holes 57 for hingedly affixing the fender foot brake 63 using a pivot pin passing through the top holes 57 and corresponding holes formed at the front extremity of the fender foot brake 63. Meanwhile, the motor 59 is affixed to the bracket 53 using typical fasteners at motor mount holes 60. A larger aperture 62 is formed in the bracket 53 through which a spindle 61 of the motor 59 extends.

In a preferred embodiment, the kit 51 for converting the scooter 1 into a motorized scooter 50 includes a low torque motor having a twenty-seven winding, single strand armature. For a preferred embodiment for creating a high performance scooter, the motor 59 includes a fourteen winding, three strand armature. The motor 59 also preferably includes internal bearings for withstanding forces imparted upon the motor's spindle 61. Suitable motors are available from Mabuchi Motor in Japan.

The kit 51 of the present invention also includes a battery pack 71 including a plurality of batteries 75 for providing electrical power to the motor. In a first preferred construction, the battery pack 71 includes twelve 1.2 volt rechargeable batteries. The batteries are wired to provide two sets of six 1.2 volt batteries wired in series, with each set of six batteries wired parallel to provide a battery pack 71 providing 7.2 volts. In a second preferred embodiment, the battery pack 71 includes fourteen 1.2 volt rechargeable batteries for providing additional torque. The batteries are wired to provide two sets of seven 1.2 volt batteries wired in series, with each set of seven batteries wired in parallel to provide a battery pack providing 8.4 volts. Providing protection for the battery pack 71 is a battery tray 73 which is affixed to the scooter 1 using Velcro attachment 77 or the like.

The battery pack 71 is connected to the motor 59 using relative high current wires 84 which extend from both the battery pack 71 and motor 59 and are connected using male and female connectors 79 and 81. The flow of current from the battery pack 71 to the motor 59 is controlled using a control circuit 85 which includes a high current relay 83 controlled by a switch constructed as an on/off button 99. Numerous suitable relays are available to those skilled in the art. However, a twelve-volt relay typically used to control the headlamps of automobiles has been found to be particularly acceptable. The on/off button 99 is connected to the relay 83 through a pair of signal wires 87 and 89, which are, in-turn, connected by a contact strip 91 and a contact bar 95 in contact with the contact strip 91 by a circular collar 105.

The kit 51 of the present invention preferably includes numerous minor attachments means for attaching the signal wires 87 and 89 to the scooter 1 such as cable ties 103 or mounting bases 101 having an adhesive backing. The above-described kit 51 provides all of the components necessary for transforming a typical prior art non-motorized scooter 1 into a motorized scooter 50, which can be installed in only a few minutes using only a hammer and a screwdriver, the assembly of which will not damage the original scooter in any way.

Figure 2:
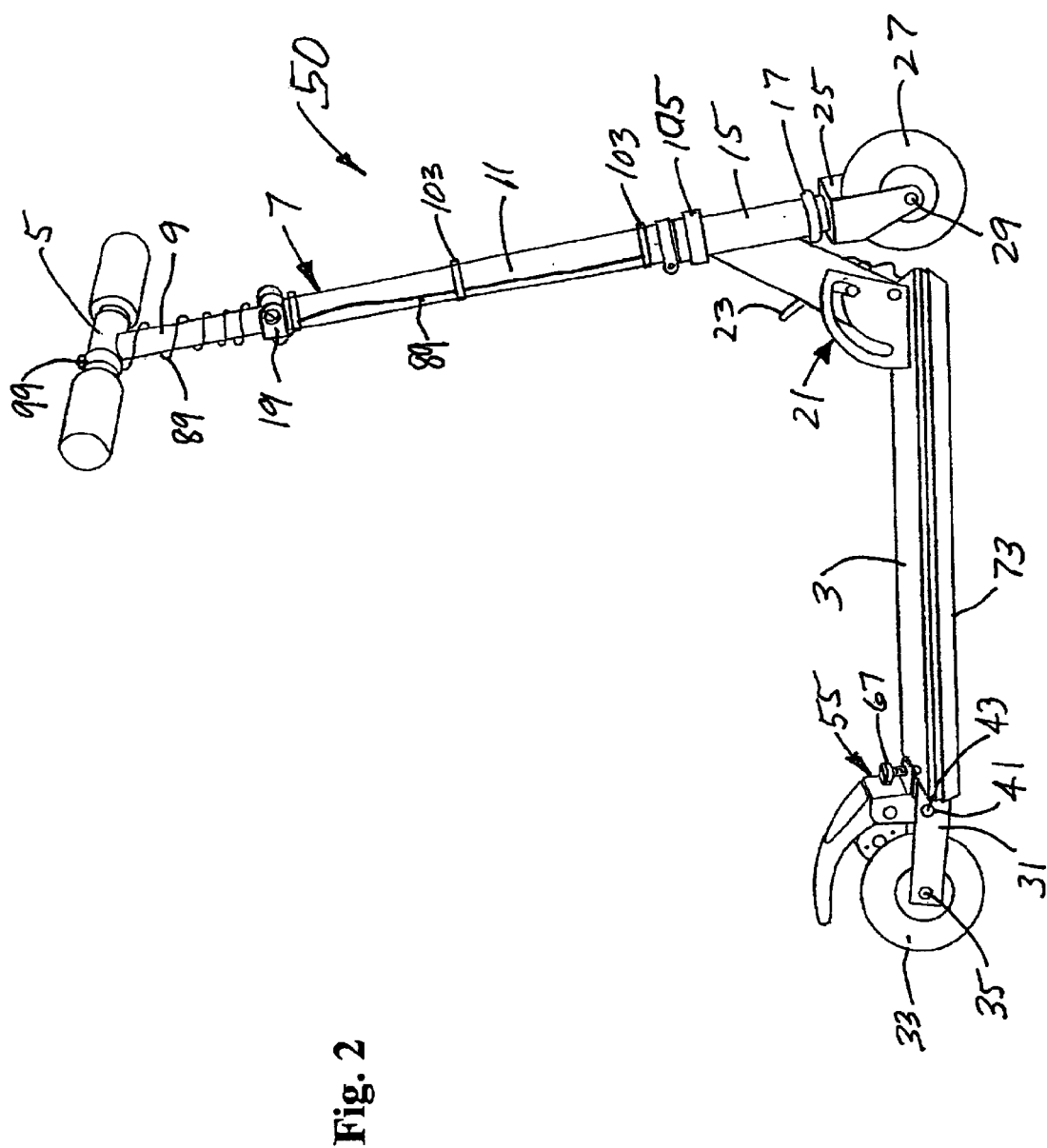
FIG. 2 is a side view of the scooter shown in FIG. 1 with the retrofit kit according to the present invention installed.

Again with reference to all of the figures, to convert the non-motorized scooter 1 into a motorized construction 50, the original fender foot brake is removed by removing the preexisting pivot pin 43. In place of the preexisting fender foot brake, the bracket 53 is affixed to the scooter's rear fork 31 using pivot pin 43 which is threaded through the holes in the rear fork 31 and the bottom holes 55 formed in the bracket 53. With reference to FIGS. 2 and 4, the bracket 53 is hingedly attached to the scooter's rear fork 31 with the pin 43 so that clockwise rotation of the thumb screw 67 against the base platform 3 causes the bracket, 53 to rotate rearwardly, which in-turn causes the motor's spindle 61 to engage the external surface of the scooter's rear wheel 33. Thus, activation of the motor 59 causes the rear wheel 33 to rotate. Conversely, counter-clockwise rotation of the thumb-screw 67 causes the force of the motor spindle 61 against the surface of the rear wheel 33 to be reduced enabling the rider of the scooter 50 to operate the scooter in a non-motorized mode. In an additional embodiment, instead of using a thumbscrew 67, a spring is used to bias the bracket 53 and motor 59 rearwardly against the scooter's rear wheel 33.

Figure 3:
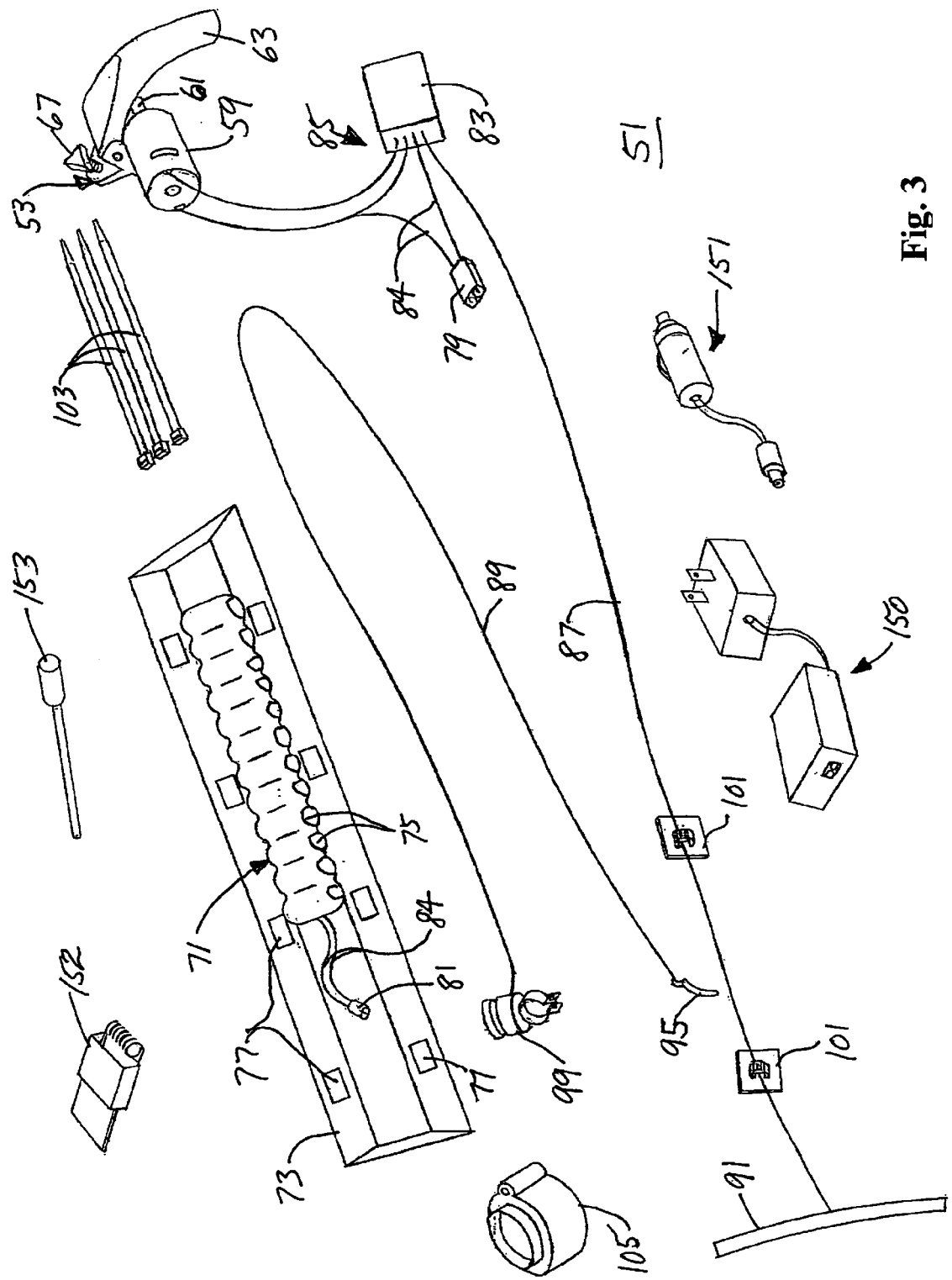
FIG. 3 is a perspective view of the retrofit kit contents, including battery tray, isolator ring, contact shoe, and motor bracket thumbscrew.

With reference to FIG. 2, the battery pack 71 and relay 83 are mounted within a channel typically formed on the underside of the scooter's base platform 3. After the battery pack 71 and relay 83 are mounted to the scooter's underside using typical fasteners known to those skilled in the art such as glue or Velcro, the battery cover 73 is also attached to the underside of the scooter's base platform 3 using Velcro or the like to protect the battery pack 71 and relay 83 from damage during riding. As shown in FIG. 3, the battery pack 71 is connected to the relay 83 and in-turn to the motor 59 through high current wires 84 and connectors 79 and 81.

The control circuit 85 is installed on the scooter 50 by routing signal wire 87 through battery cover 73 to the front of the scooter's base platform 3 and then upwardly along the side of the scooter's head tube 15. Preferably, the wire 87 is affixed in place using adhesive backed tie bases 101 and cable ties 103. The contact strip 91 is affixed in annular fashion to the top of the head tube 15 using double stick tape or the like to form an electrical ring on the head tube's upper exterior surface. Meanwhile, the collar 105 is affixed to the lower extremity of the rotable steering column 7 so that the lower portion of the collar extends concentrically around the contact strip 91. Attached to the interior of the collar 105 is the contact bar 95 which is positioned to slidably contact the side of the contact strip 91 as the steering column 7 and collar 105 are rotated. The single wire 89 extending from the contact bar 95 is routed upwardly along the length of the steering column 7, and preferably is coiled along the steering column's upper tube 9 so that the upper tube 9 may still telescopically extend and retract within the steering column's lower tube 11. The on/off button 99 is then affixed to the handlebars 5 using a bracket or tie wraps as could be constructed by those skilled in the art.

The on/off button 99 is preferably constructed so that depression of the button causes a current to flow through the switch, with the removal of pressure from the on/off button 99 causing the circuit to open. As would be understood by those skilled in the art, the signal wires 89 and 87, in cooperation with contact strip 91, in rotational contact with contact bar 95 provide a first electrical path to the on/off button 99 from the relay 83. Providing a second electrical path from the on/off button 99 to the relay 83 is the frame of the scooter 50 itself. To this end, the handlebars 5, steering column 7, bearings 17, head tube 15, hinge assembly 21 and base platform 3 are all constructed of electrically conductive metal such as stainless steel. One of the terminals of the on/off button 99 is electrically connected directly to the underside of the platform base 3. Thus, depression of on/off button 99 causes a circuit to close through signal wire 89, contact strip 91, contact bar 95, signal wire 87, handlebars 5, steering column 7, bearings 17, head tube 15, hinge assembly 21 and base platform 3 causing the relay 83 to close, permitting current to flow from battery pack 71 to the motor 59.

Once the components of the kit 51 have been installed on the scooter 1, a motorized scooter 50 is thus provided. Depressing the on/off button 99 energizes the motor 59 causing the rear wheel 33 to rotate. Braking is provided by depressing the fender foot brake 63 against the rear wheel 33.

The preferred embodiment is the complete kit 51 (FIG. 3) ready for consumer purchase which includes battery charger 150, twelve volt adapter 151, spring installer 152, pin installer 153 and all necessary wiring and relay installations.

Although the present invention has described with reference to the preferred embodiments, workers skilled in the art will recognize that changes may be made in form and detail without departing from the spirit and scope of the invention.

I claim:

1. A retrofit kit for motorizing a collapsible mini scooter, the mini scooter including a base platform having front and rear wheels rotatably mounted at front and rear ends thereof respectively and a steering column coupled to the front wheel for steering the mini scooter, the retrofit kit comprising:

an electric motor having a rotatable spindle;

a bracket adapted to mount said motor adjacent the mini scooter rear wheel in a position for drivingly engaging the rear wheel with said spindle;

a thumb screw threadably engaging said bracket for selective movement of said bracket to engage and disengage said spindle with the rear wheel;

a battery pack adapted to be mounted on the mini scooter base platform for generating electrical power to operate said motor;

wiring for electrically connecting said battery pack to said motor; and a manually actuatable switch adapted to be mounted on the mini scooter steering column and connected to said wiring for selectively applying electrical power from said battery pack to said motor thereby rotating the rear wheel.

2. The retrofit kit according to claim 1 including a battery tray retaining said battery pack.

3. The retrofit kit according to claim 2 including a means for releasably attaching said battery tray with an underside of the base platform.

4. The retrofit kit according to claim 3 wherein said means for releasably attaching includes hook and loop fasteners.

5. The retrofit kit according to claim 1 including an electrical relay connected between said motor and said battery pack in series with said wiring.

6. The retrofit kit according to claim 5 including a control circuit connected between said relay and said switch whereby actuation of said switch actuates said relay to apply the electrical power from said battery pack to said motor.

7. The retrofit kit according to claim 1 including a foot brake pivotally attached to said bracket for engaging the rear wheel to prevent rotation thereof.

8. The retrofit kit according to claim 1 wherein said switch is an on/off pushbutton switch.

9. A retrofit kit for motorizing a collapsible mini scooter, the mini scooter including a base platform having front and rear wheels rotatably mounted at front and rear ends thereof respectively and a steering column coupled to the front wheel for steering the mini scooter, the retrofit kit comprising:

an electric motor having a rotatable spindle;

a bracket adapted to mount said motor adjacent the mini scooter rear wheel in a position for drivingly engaging the rear wheel with said spindle;

a battery pack adapted to be mounted on the mini scooter base platform for generating electrical power to operate said motor;

wiring for electrically connecting said battery pack to said motor;

a manually actuatable switch adapted to be mounted on the mini scooter steering column and connected to said wiring for selectively applying electrical power from said battery pack to said motor thereby rotating the rear wheel; and a control circuit connected between said wiring and said switch, said control circuit having a contact strip adapted to be attached to a head tube extending from the base platform and a contact bar adapted to be attached to the steering column, said contact strip and said contact bar cooperating to provide an electrical connection between said wiring and said switch.

10. A retrofit kit for motorizing a collapsible mini scooter, the mini scooter including a base platform having front and rear wheels rotatably mounted at front and rear ends thereof respectively, a head tube extending from the front end of the base platform and a steering column extending through the head tube and coupled to the front wheel for steering the mini scooter, the retrofit kit comprising:

an electric motor having a rotatable spindle;

a bracket adapted to mount said motor adjacent the mini scooter rear wheel in a position for drivingly engaging the rear wheel with said spindle;

a thumb screw threadably engaging said bracket for selective movement of said bracket to engage and disengage said spindle with the rear wheel:

a foot brake pivotally attached to said bracket for engaging the rear wheel to prevent rotation thereof;

a battery pack adapted to be mounted on the mini scooter base platform for generating electrical power to operate said motor;

wiring for electrically connecting said battery pack to said motor;

a manually actuatable switch adapted to be mounted on the mini scooter steering column and connected to said wiring for selectively applying electrical power from said battery pack to said motor thereby rotating the rear wheel.

11. The retrofit kit according to claim 10 including an electrical relay connected between said motor and said battery pack in series with said wiring.

12. The retrofit kit according to claim 11 including a control circuit connected between said relay and said switch whereby actuation of said switch actuates said rely to apply the electrical power from said battery pack to said motor.

13. The retrofit kit according to claim 10 including a battery tray retaining said battery pack.

14. The retrofit kit according to claim 13 including hook and loop fasteners for releasably attaching said battery tray with an underside of the base platform.

15. A retrofit kit for motorizing a collapsible mini scooter, the mini scooter including a base platform having front and rear wheels rotatably mounted at front and rear ends thereof respectively, a head tube extending from the front end of the base platform and a steering column extending through the head tube and coupled to the front wheel for steering the mini scooter, the retrofit kit comprising:

an electric motor having a rotatable spindle;

a bracket adapted to mount said motor adjacent the mini scooter rear wheel in a position for drivingly engaging the rear wheel with said spindle;

a foot brake pivotally attached to said bracket for engaging the rear wheel to prevent rotation thereof;

a battery pack adapted to be mounted on the mini scooter base platform for generating electrical power to operate said motor;

wiring for electrically connecting said battery pack to said motor;

a manually actuatable switch adapted to be mounted on the mini scooter steering column and connected to said wiring for selectively applying electrical power from said battery pack to said motor thereby rotating the rear wheel; and a control circuit connected between said wiring and said switch, said control circuit having a contact strip adapted to be attached to a head tube extending from the base platform and a contact bar adapted to be attached to the steering column, said contact strip and said contact bar cooperating to provide an electrical connection between said wiring and said switch.

16. A retrofit kit for motorizing a collapsible mini scooter, the mini scooter including a base platform having front and rear wheels rotatably mounted at front and rear ends thereof respectively, a head tube extending from the front end of the base platform and a steering column extending through the head tube and coupled to the front wheel for steering the mini scooter, the retrofit kit comprising:

an electric motor having a rotatable spindle;

a bracket adapted to pivotally mount said motor adjacent the mini scooter rear wheel in a position for drivingly engaging the rear wheel with said spindle;

a thumb screw threadably engaging said bracket and adapted to contact said base platform for selectively pivoting said bracket engage and disengage said spindle with the rear wheel;

a foot brake pivotally attached to said bracket for engaging the rear wheel to prevent rotation thereof;

a battery pack adapted to be mounted on the mini scooter base platform for generating electrical power to operate said motor;

wiring for electrically connecting said battery pack to said motor;

a control circuit including a manually actuatable switch adapted to be mounted on the mini scooter steering column, said control circuit connecting said switch to said wiring for selectively applying electrical power from said battery to said motor thereby rotating the rear wheel.

17. The retrofit kit according to claim 16 including hook and loop fasteners for releasably attaching said battery pack with an underside of the base platform.

* * * * *